(12) United States Patent
Inoue (10) Patent No.: US 10,784,748 B2
(45) Date of Patent: Sep. 22, 2020

(54) COOLING STRUCTURE OF ROTARY ELECTRIC MACHINE AND ROTARY ELECTRIC MACHINE

(71) Applicant: HONDA MOTOR CO., LTD., Minato-ku, Tokyo (JP)

(72) Inventor: Masashi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 16/276,844

(22) Filed: Feb. 15, 2019

(65) Prior Publication Data

US 2019/0260270 A1 Aug. 22, 2019

(30) Foreign Application Priority Data

Feb. 21, 2018 (JP) .................................. 2018-029153

(51) Int. Cl.
*H02K 9/00* (2006.01)
*H02K 9/19* (2006.01)
(Continued)

(52) U.S. Cl.
CPC .............. *H02K 9/19* (2013.01); *H02K 1/165* (2013.01); *H02K 1/20* (2013.01); *H02K 1/30* (2013.01);
(Continued)

(58) Field of Classification Search
CPC ............ H02K 9/19; H02K 1/165; H02K 1/20; H02K 1/30; H02K 3/12; H02K 9/197; H02K 2201/06; H02K 2213/03
(Continued)

(56) References Cited

U.S. PATENT DOCUMENTS 3,675,056 A * 7/1972 Lenz ........................ H02K 9/20
310/54
5,557,153 A * 9/1996 Zimmermann .......... H02K 9/26
310/56
(Continued)

FOREIGN PATENT DOCUMENTS

JP 2001-119869 4/2001
JP 2003-018802 1/2003
(Continued)

OTHER PUBLICATIONS

Japanese Office Action for Japanese Patent Application No. 2018-029153 dated Oct. 23, 2019.
(Continued)

*Primary Examiner* — Thanh Lam
(74) *Attorney, Agent, or Firm* — Amin, Turocy & Watson, LLP (57) ABSTRACT

A cooling structure of a rotary electric machine for power generation which includes a rotor and a stator includes a stator core which is formed in an annular shape to surround the rotor and has a plurality of slots arranged in a circumferential direction and extending from one end to the other end in a center axis direction, a conductor which is disposed in the slots and has a protruding portion protruding from the slots in the center axis direction, a cooling unit which cools the protruding portion. Opening portions of the slots are formed in an inner peripheral surface of the stator core, and the opening portions extend toward an upstream side in a rotation direction of the rotor at a time of regeneration from ends on the protruding portion side toward intermediate portions in the center axis direction.

10 Claims, 7 Drawing Sheets

(51) Int. Cl.
   *H02K 3/12*   (2006.01)
   *H02K 1/30*   (2006.01)
   *H02K 1/16*   (2006.01)
   *H02K 1/20*   (2006.01)
   *H02K 9/197*  (2006.01)

(52) U.S. Cl.
   CPC ............... *H02K 3/12* (2013.01); *H02K 9/197* (2013.01); *H02K 2201/06* (2013.01); *H02K 2213/03* (2013.01)

(58) Field of Classification Search
   USPC .................................................... 310/54–59
   See application file for complete search history.

(56) References Cited

U.S. PATENT DOCUMENTS

| | | | | |
|---|---|---|---|---|
| 7,348,707 | B2* | 3/2008 | Laskaris | H02K 1/12 310/216.004 |
| 8,040,000 | B2* | 10/2011 | Baik | H02K 1/20 310/216.002 |
| 2011/0133580 | A1* | 6/2011 | Sugimoto | H02K 1/20 310/54 |
| 2014/0265657 | A1* | 9/2014 | Raczek | H02K 9/19 310/54 |
| 2015/0108857 | A1* | 4/2015 | Takahashi | H02K 9/19 310/54 |
| 2017/0237306 | A1* | 8/2017 | Juris | H02K 1/20 310/52 |

FOREIGN PATENT DOCUMENTS

| | | |
|---|---|---|
| JP | 2010-115054 | 5/2010 |
| JP | 2014-176106 | 9/2014 |
| JP | 2017-105321 | 6/2017 |
| WO | 2017/018067 | 2/2017 |

OTHER PUBLICATIONS

Japanese Office Action for Japanese Patent Application No. 2018-029153 dated Jun. 23, 2020.

* cited by examiner

COOLING STRUCTURE OF ROTARY ELECTRIC MACHINE AND ROTARY ELECTRIC MACHINE

CROSS-REFERENCE TO RELATED APPLICATION

Priority is claimed on Japanese Patent Application No. 2018-029153, filed Feb. 21, 2018, the content of which is incorporated herein by reference.

BACKGROUND OF THE INVENTION

Field of the Invention

The present invention relates to a cooling structure of a rotary electric machine, and a rotary electric machine.

Description of Related Art

A rotary electric machine such as an electric motor includes a stator and a rotor. The stator includes a stator core which has an annular yoke and teeth extending radially inward from the yoke, and a conductor (coil) disposed in a slot between the teeth adjacent in a circumferential direction. In the rotary electric machine having this type of stator, a slot opening portion between tip ends of the teeth adjacent to each other in the circumferential direction is skewed so as to be inclined with respect to an axial direction and thus to minimize a torque ripple (for example, refer to Japanese Unexamined Patent Application, First Publication No. 2003-18802 (hereinafter, Patent Document 1)). Patent Document 1 describes a stator including a core member formed so that a gap between adjacent magnetic pole portions is skewed in a stacking direction by sequentially stacking a plurality of plate-shaped magnetic members including a plurality of yoke portions and magnetic pole tooth portions protruding from the yoke portions and formed on both sides of each tip end thereof by causing magnetic pole portions to protrude such that protruding lengths sequentially increase and decrease by the same length in the stacking direction.

SUMMARY OF THE INVENTION

As described above, in the stator core in which the slot opening portion is skewed, a cross-sectional shape thereof orthogonal to the axial direction differs according to a position in the axial direction. Therefore, since an interlinking amount of leakage magnetic flux from the rotor to a conductor varies according to the position in the axial direction, a magnitude of an eddy current generated in the conductor changes according to the position in the axial direction. In particular, in a rotary electric machine having so-called segment coils formed by conductors of respective phases connecting a plurality of members to each other, a space factor of the conductor in the slot may be increased while an excessive eddy current loss due to the leakage magnetic flux may occur. Thus, a degree of heat generation in the conductor varies according to the position in the axial direction. Accordingly, it is desirable to appropriately cool each portion of the conductor according to the degree of heat generation. However, Patent Document 1 does not describe the cooling of the conductor.

An aspect of the present invention has been made in view of the above circumstances, and an object thereof is to provide a cooling structure of a rotary electric machine and a rotary electric machine which are capable of appropriately cooling a conductor.

In order to solve the above problem and to achieve the object, the present invention adopts the following aspects.

(1) A cooling structure of a rotary electric machine according to one aspect of the present invention is a cooling structure of a rotary electric machine for power generation which includes a rotor and a stator, including a stator core which is formed in an annular shape to surround the rotor and has a plurality of slots arranged in a circumferential direction and extending from one end to the other end in a center axis direction, a conductor which is disposed in the slots and has a protruding portion protruding from the slots in the center axis direction, and a cooling unit which cools the protruding portion, wherein opening portions of the slots are formed in an inner peripheral surface of the stator core, and the opening portions extend toward an upstream side in a rotation direction of the rotor at a time of regeneration from ends on the protruding portion side toward intermediate portions in the center axis direction.

In the above-described aspect (1), the opening portions of the slots extend toward an upstream side in a rotation direction of the rotor at the time of regeneration from ends on the protruding portion side of the conductor toward intermediate portions in the center axis direction.

Therefore, in the conductor disposed in the slots, an eddy current loss larger than that in the surroundings occurs at the same positions in the center axis direction as ends of the opening portions of the slots on the protruding portion side of the conductor. Thus, the temperature of the conductor is higher than that in the surroundings at the same positions in the center axis direction as the ends of the opening portions of the slots on the protruding portion side of the conductor.

According to the aspect (1), since the cooling unit cools the protruding portion of the conductor, it is possible to efficiently cool portions of the opening portions of the slots which are located at the same positions as the end of the conductor on the protruding portion side in the center axis direction and in which the temperature of the conductor becomes higher than that in the surroundings. Therefore, the conductor can be cooled appropriately.

(2) In the aspect (1), the intermediate portions of the opening portions may be located on the upstream side in the rotation direction of the rotor at the time of regeneration from both ends of the opening portions in the center axis direction, and the cooling unit may cool the protruding portion on both sides in the center axis direction.

In the aspect (2), the temperature of the conductor becomes higher than that in the surroundings at the same positions as both ends of the slot opening portions in the center axis direction. According to the above aspect (2), since the cooling unit cools the protruding portions on both sides of the conductor in the center axis direction, it is possible to efficiently cool the portion of the conductor which is located at the same positions as both ends of the opening portions of the slots in the center axis direction and in which the temperature is higher than that in the surroundings.

(3) In the aspect (1) or (2), the stator core may include teeth that are formed between adjacent slots in the circumferential direction, the opening portions may be formed between tip ends of the teeth adjacent to each other in the circumferential direction, and the intermediate portions of the opening portions may be located on the upstream side at a predetermined angle, at which a protrusion is formed at the tip end of each of the teeth in the rotation direction of the rotor at the time of regeneration, from an end of the opening portion on the protruding portion side.

According to the aspect (3), since the protrusions are always formed at the tip ends of the teeth irrespective of the positions thereof in the center axis direction, only thin ribs are punched out at the tip ends of the teeth when the stator core is punched out by press working, and thus it can be manufactured more easily.

(4) A cooling structure of a rotary electric machine according to one aspect of the present invention is a cooling structure of a rotary electric machine which includes a rotor and a stator, including a stator core which is formed in an annular shape to surround the rotor and has a plurality of slots arranged in a circumferential direction and extending from one end to the other end in a center axis direction, a conductor which is disposed in the slots and has a protruding portion protruding from the slots in the center axis direction, and a cooling unit which cools the protruding portion, wherein opening portions of the slots are formed in an inner peripheral surface of the stator core, and the opening portions extend toward a downstream side in a rotation direction of the rotor at a time of power running from ends on the protruding portion side toward intermediate portions in the center axis direction.

In the aspect (4), the opening portions of the slots extend toward the downstream side in the rotation direction of the rotor during power running from the end of the conductor on the protruding portion side toward the intermediate portions in the center axis direction.

Therefore, in the conductor disposed in the slots, an eddy current loss larger than that in the surroundings occurs at the same position as the ends of the opening portions of the slots on the protruding portion side of the conductor in the center axis direction. Thus, the temperature of the conductor is higher than that in the surroundings at the same positions as the ends of the opening portions of the slots on the protruding portion side of the conductor in the center axis direction.

According to the aspect (4), since the cooling unit cools the protruding portion of the conductor, it is possible to efficiently cool the portion of the conductor which is located at the same positions as both ends of the opening portions of the slots in the center axis direction and in which the temperature is higher than that in the surroundings. Therefore, the conductor can be cooled appropriately.

(5) In the aspect (4), the intermediate portions of the opening portions may be located on the downstream side in the rotation direction of the rotor at the time of power running from both ends of the opening portions in the center axis direction, and the cooling unit may cool the protruding portion on both sides in the center axis direction.

In the aspect (5), the temperature of the conductor becomes higher than that in the surroundings at the same positions as both ends of the slot opening portions in the center axis direction. According to the above aspect (5), since the cooling unit cools the protruding portions on both sides of the conductor in the center axis direction, it is possible to efficiently cool the portion of the conductor which is located at the same positions as both ends of the opening portions of the slots in the center axis direction and in which the temperature is higher than that in the surroundings.

(6) In the aspect (4) or (5), the stator core may include teeth that are formed between adjacent slots in the circumferential direction, the opening portions may be formed between tip ends of the teeth adjacent to each other in the circumferential direction, and the intermediate portions of the opening portions may be located on the downstream side at a predetermined angle, at which a protrusion is formed at the tip end of each of the teeth in the rotation direction of the rotor at the time of power running, from an end of the opening portion on the protruding portion side.

According to the aspect (6), since the protrusions are always formed at the tip ends of the teeth irrespective of the positions thereof in the center axis direction, only thin ribs are punched out at the tip ends of the teeth when the stator core is punched out by press working, and thus it can be manufactured more easily.

(7) In the aspect (3) or (6), the predetermined angle may be 2.5°.

According to the aspect (7), the eddy current loss in the conductor becomes larger at the same positions as both ends of the opening portions of the slots in the center axis direction than at the same positions as the intermediate portions of the opening portions of the slots in the center axis direction. Thus, it is possible to efficiently cool the portion of the conductor in which the temperature becomes higher than that in the surroundings by cooling the protruding portion of the conductor with the cooling unit.

(8) In any one of the aspects (1) to (7), the cooling unit may drip a coolant to the protruding portion.

According to the aspect (8), it is possible to cool the protruding portion of the conductor.

(9) In any one of the aspects (1) to (7), the rotor may include a rotating shaft formed in a hollow and through which a coolant flows, a rotor core penetrating the rotating shaft and disposed inside the stator core, and a pair of end surface plates sandwiching the rotor core from both sides in the center axis direction, and the cooling unit may include a coolant supply unit which supplies a coolant to an inside of the rotating shaft, a through-hole which is open to an outer peripheral surface of the rotating shaft, a core flow path which is formed in the rotor core and communicates with the inside of the rotating shaft via the through-hole, and an end surface flow path which is formed between the rotor core and the end surface plate, communicates with the core flow path and opens outward in a radial direction at the same position as the protruding portion in the center axis direction.

According to the aspect (9), the rotor can be cooled by allowing the coolant to flow through the inside of the rotating shaft, the core flow path, and the end surface flow path. Furthermore, since the coolant is discharged radially outward from the end surface flow path by a centrifugal force, it is possible to apply the coolant to the protruding portion of the conductor. Accordingly, the protruding portion of the conductor can be cooled. Therefore, it can serve as means for cooling the rotor and means for cooling the conductor. Therefore, the constitution of the rotary electric machine can be simplified.

(10) A rotary electric machine according to one aspect of the present invention includes the cooling structure of the rotary electric machine according to any one of the aspects (1) to (9).

According to the aspect (10), it is possible to provide a rotary electric machine in which the conductor is appropriately cooled and performance deterioration due to an increase of temperature is minimized.

According to the aspects of the present invention, it is possible to appropriately cool a conductor.

DETAILED DESCRIPTION OF THE INVENTION

Hereinafter, embodiments of the present invention will be described with reference to the drawings. In the following description, constitutions having the same or similar functions are given the same reference numerals. Additionally, duplicate explanations of those constitutions may be omitted.

First Embodiment

Figure 1:
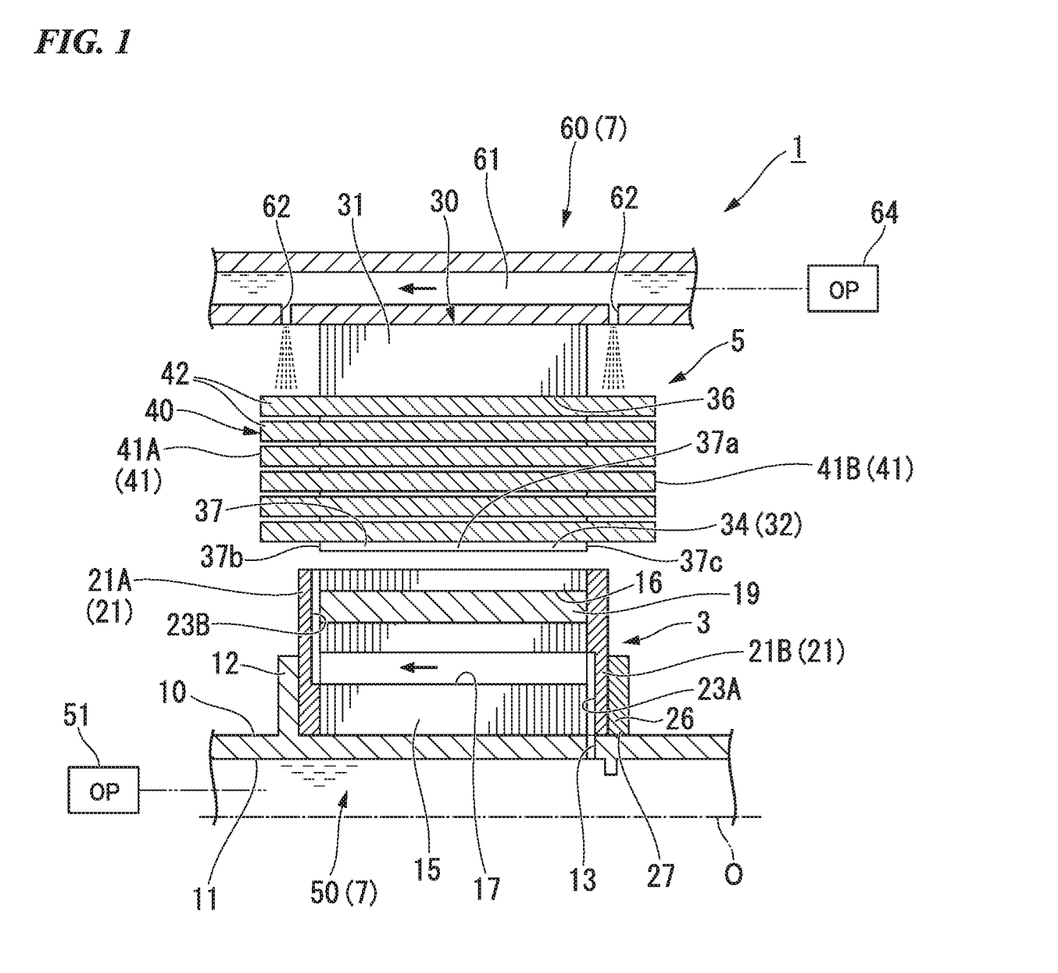
FIG. 1 is a cross-sectional view schematically showing a schematic constitution of a rotary electric machine according to a first embodiment.

FIG. 1 is a cross-sectional view schematically showing a schematic constitution of a rotary electric machine according to a first embodiment.

As shown in FIG. 1, the rotary electric machine 1 is a motor for power generation mounted in a vehicle such as a hybrid car or an electric car. In the following description, a direction of a rotational axis O of the rotary electric machine 1 is referred to as an "axial direction," a circumferential direction around the rotational axis O is simply referred to as a "circumferential direction," and a direction orthogonal to the axial direction and extending radially from the rotational axis O is referred to as a "radial direction." The rotary electric machine 1 includes a rotor 3, a stator 5, and a cooling unit 7.

The rotor 3 is provided to be rotatable around the rotational axis O with respect to the stator 5. The rotor 3 includes a rotating shaft 10, a rotor core 15, a magnet 19, an end surface plate 21, and a collar 26.

The rotating shaft 10 is a hollow cylindrical member with the rotational axis O as a center axis. The rotating shaft 10 is formed of a metal material such as stainless steel or iron. The inside of the rotating shaft 10 is a hollow and constitutes an axial flow path 11 through which a coolant that will be described later flows. An enlarged diameter portion 12 and a discharge hole 13 (a through-hole) are formed in the rotating shaft 10. The enlarged diameter portion 12 protrudes radially outward from an outer peripheral surface of the rotating shaft 10. The discharge hole 13 is open to the outer peripheral surface of the rotating shaft 10 and communicates the axial flow path 11 with the outside of the rotating shaft 10.

The rotor core 15 is formed in an annular shape with the rotation axis O as a center axis and is externally fitted to the rotating shaft 10. The rotor core 15 is formed of electromagnetic steel. A plurality of magnet slots 16 are formed in a peripheral edge portion of the rotor core 15 to pass therethrough in the axial direction. The plurality of magnet slots 16 are arranged and disposed in the circumferential direction. Further, a core flow path 17 through which a coolant can flow is formed in the rotor core 15. The core flow path 17 is formed radially inward from the magnet slots 16 and passes through the rotor core 15 in the axial direction.

The magnet 19 is accommodated in the magnet slots 16 of the rotor core 15. The magnet 19 is, for example, a neodymium magnet or the like. The magnet 19 is magnetized in a radial direction and forms a plurality of magnetic pole portions on the outer peripheral portion of the rotor core 15. The plurality of magnetic pole portions are formed so that a magnetization direction is reversed alternately in the circumferential direction.

The end surface plate 21 has a first end surface plate 21A and a second end surface plate 21B which sandwich the rotor core 15 from both sides in the axial direction. The first end surface plate 21A is disposed to face a first end surface of the rotor core 15 directed to one side in the axial direction. The second end surface plate 21B is disposed to face a second end surface of the rotor core 15 directed to the other side in the axial direction. The end surface plate 21 is annularly formed of a nonmagnetic metal material, for example, SUS 304, aluminum, copper, or the like, and is disposed coaxially with the rotating shaft 10. An inner diameter of the end surface plate 21 is equal to an outer diameter of the rotating shaft 10. The first end surface plate 21A is sandwiched between the rotor core 15 and the enlarged diameter portion 12 of the rotating shaft 10, and movement thereof in the axial direction is restricted. The second end surface plate 21B is sandwiched between the rotor core 15 and the collar 26, and movement thereof in the axial direction is restricted.

End surface flow paths 23A and 23B through which a coolant can flow are formed between the rotor core 15 and the end surface plate 21. The end surface flow paths 23A and 23B are formed by providing grooves in the end surface plate 21, for example. The end surface flow paths 23A and 23B are an inner peripheral side end surface flow path 23A and an outer peripheral side end surface flow path 23B. The inner peripheral side end surface flow path 23A is formed between the rotor core 15 and the second end surface plate 21B. The inner peripheral side end surface flow path 23A extends in a direction orthogonal to the axial direction. A radially outer end of the inner peripheral side end surface flow path 23A communicates with the other end of the core flow path 17 in the axial direction. A radially inner end of the inner peripheral side end surface flow path 23A communicates with the axial flow path 11 via the discharge hole 13 of the rotating shaft 10. The outer peripheral side end surface flow path 23B is formed between the rotor core 15 and the first end surface plate 21A. The outer peripheral side end surface flow path 23B extends in a direction orthogonal to the axial direction. A radially inner end of the outer peripheral side end surface flow path 23B communicates with an end of the core flow path 17 on one side in the axial direction. A radially outer end of the outer peripheral side end surface flow path 23B is open to an outer peripheral surface of the rotor 3.

The collar 26 is formed in a disk shape of iron or the like, for example and is disposed coaxially with the rotating shaft 10. A press-fit hole 27 is formed in a radial center portion of the collar 26 to pass therethrough in the axial direction.

An inner diameter of the press-fit hole 27 is formed smaller than an outer diameter of the rotating shaft 10 and has a fastening margin between the press-fit hole 27 and the rotating shaft 10. The collar 26 is in contact with the second end surface plate 21B and is press-fitted and fixed to the rotating shaft 10 in a state in which the rotor core 15 and the end surface plate 21 are pressed against the enlarged diameter portion 12 of the rotating shaft 10.

Figure 2:
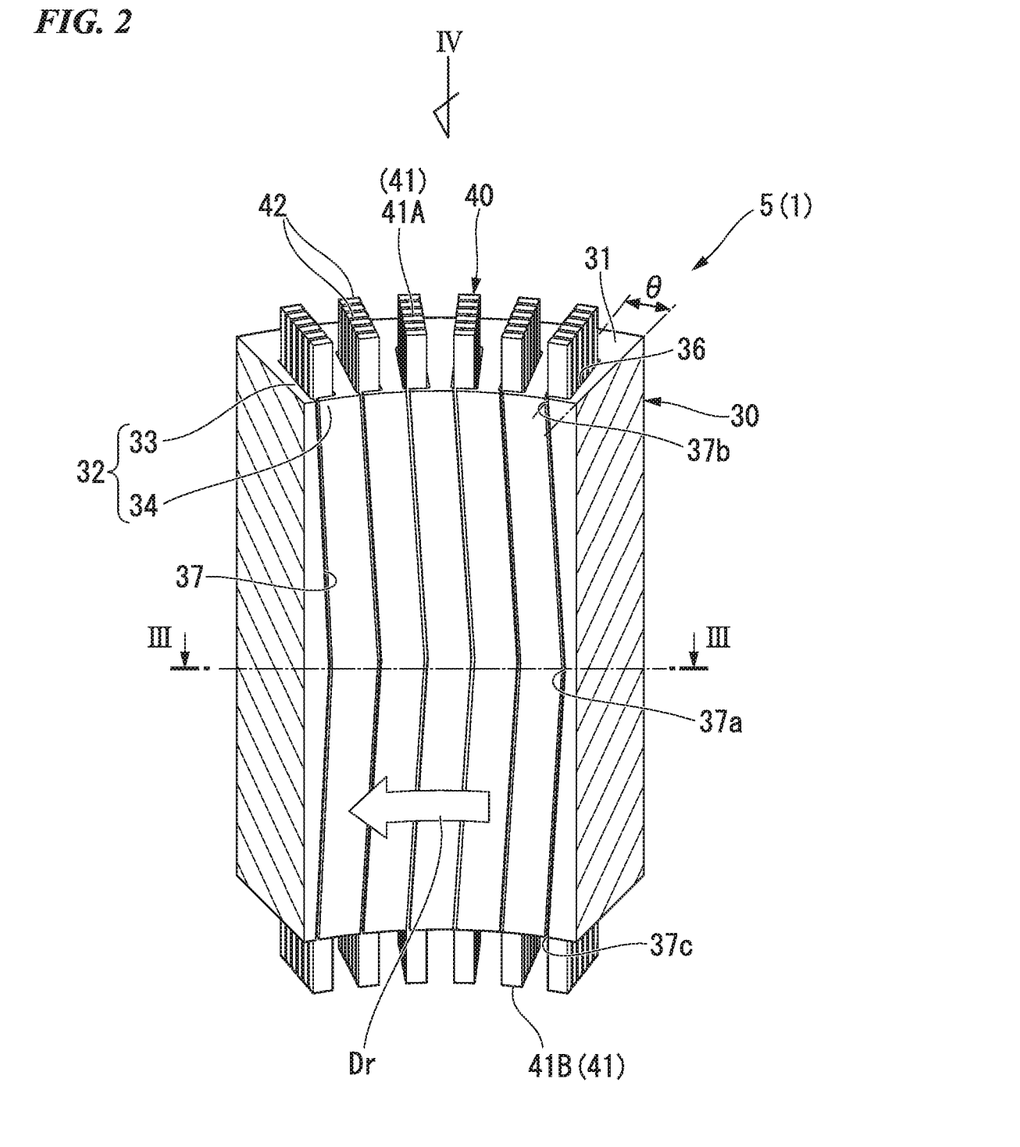
FIG. 2 is a perspective view showing part of a stator according to the first embodiment.

FIG. 2 is a perspective view showing part of a stator according to the first embodiment.

As shown in FIG. 2, the stator 5 includes a stator core 30 and coils 40 (conductors) of a plurality of phases (for example, a U phase, a V phase, and a W phase) mounted on the stator core 30.

The stator core 30 is formed in a cylindrical shape which is coaxial with the rotor core 15 (refer to FIG. 1) to surround the rotor 3 from the outside in the radial direction. The stator core 30 includes a cylindrical back yoke 31 and a plurality (48 in the embodiment) of teeth 32 which protrude radially inward from an inner peripheral surface of the back yoke 31.

The plurality of teeth 32 are arranged at equal angular intervals in the circumferential direction. Each of the teeth 32 includes a winding drum portion 33 extending in the radial direction and around which the coil 40 is wound, and flange portions 34 extending from a radially inner tip end of the winding drum portion 33 to both sides in the circumferential direction. Groove-shaped slots 36 are formed between adjacent teeth 32 in the circumferential direction. That is, each of the teeth 32 is provided between the mutually adjacent slots 36 in the circumferential direction. In the stator core 30, the winding drum portions 33 and the slots 36 are alternately disposed in the circumferential direction. In the embodiment, since 48 teeth 32 are provided, the slots 36 are arranged every 7.5° in the circumferential direction.

The slots 36 extend from one end to the other end of the stator core 30 in the axial direction and are open to both sides in the axial direction. The slots 36 extend parallel to the rotational axis O (refer to FIG. 1).

Opening portions 37 of the slots 36 are formed in an inner peripheral surface of the stator core 30. Hereinafter, the opening portions 37 of the slots 36 will be referred to as slot opening portions 37. The slot opening portions 37 are formed between tip ends of the adjacent teeth 32 in the circumferential direction. Specifically, the slot opening portions 37 are formed between end surfaces of a pair of flange portions 34 facing each other in the circumferential direction. The slot opening portions 37 extend from one end of the stator core 30 to the other end in the axial direction.

The slot opening portions 37 extend toward an upstream side in a rotation direction of the rotor 3 at the time of regeneration from first ends 37b on one side in the axial direction toward intermediate portions 37a. Further, the slot opening portions 37 extend toward the upstream side in the rotation direction of the rotor 3 at the time of regeneration from second ends 37c on the other side in the axial direction toward the intermediate portions 37a. In each of the drawings, the rotation direction of the rotor 3 at the time of regeneration is indicated by an arrow Dr. The intermediate portions 37a of the slot opening portions 37 are separated from both ends 37b and 37c of the slot opening portions 37 by the same distance in the axial direction. Both ends 37b and 37c of the slot opening portions 37 are provided at the same positions in the circumferential direction. The slot opening portions 37 extend obliquely at a certain angle with respect to the axial direction toward both axial sides centering on the intermediate portions 37a.

The intermediate portions 37a of the slot opening portions 37 are located on the upstream side at a predetermined angle in the rotation direction of the rotor 3 at the time of regeneration from both ends 37b and 37c. The predetermined angle is an angle at which a minute protrusion (the flange portion 34) protruding to a downstream side in the rotation direction of the rotor 3 at the time of regeneration can be formed at each of tip ends of the teeth 32 at the intermediate portions 37a of the slot opening portions 37. That is, the flange portions 34 of the teeth 32 protrude to the downstream side in the rotation direction of the rotor 3 at the time of regeneration at positions defining the intermediate portions 37a of the slot opening portions 37 (refer to FIG. 3). In the embodiment, the predetermined angle is 2.5°.

Figure 3:
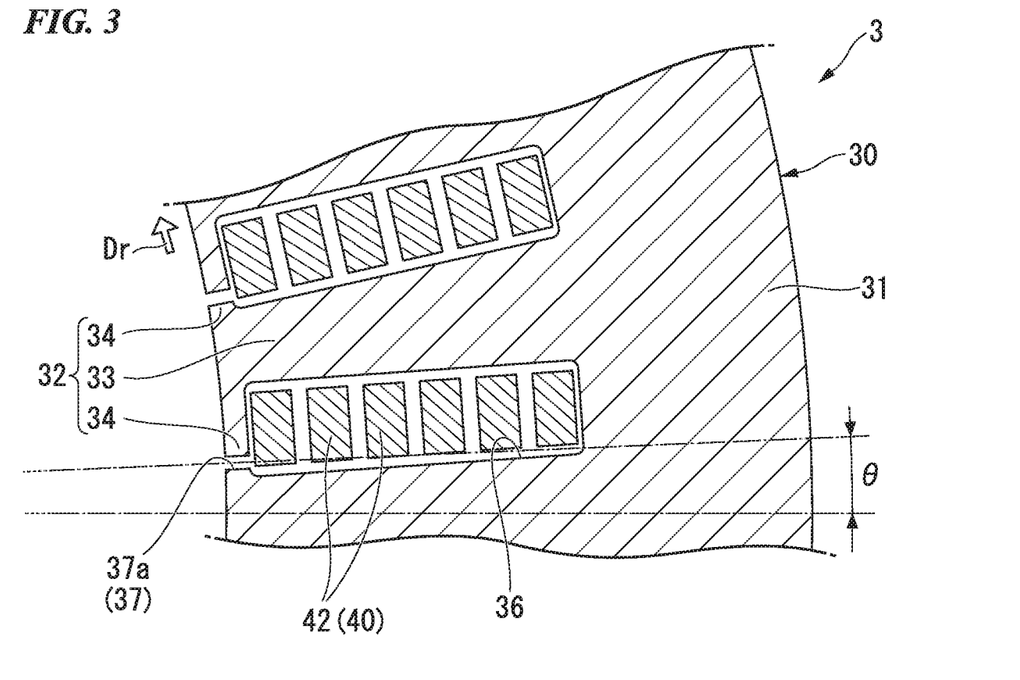
FIG. 3 is a cross-sectional view taken along line III-III of FIG. 2.

FIG. 3 is a cross-sectional view taken along line of FIG. 2.

As shown in FIG. 3, the intermediate portions 37a of the slot opening portions 37 open the vicinity of ends of the slots 36 on the upstream side in the rotation direction of the rotor 3 at the time of regeneration. Here, in the first embodiment, an opening angle θ of the slot opening portions 37 is defined as follows. In the cross-sectional view of the stator core 30 in the axial direction, the opening angle θ of the slot opening portions 37 is a center angle between center lines of the slot opening portions 37 and a center line of the winding drum portion 33 of each of the teeth 32 defining the slot opening portions 37 from the upstream side in the rotation direction of the rotor 3 at the time of regeneration. The center lines of the slot opening portions 37 are half lines extending from the rotational axis O toward center portions of the slot opening portions 37 in the circumferential direction when seen in the axial direction. The center lines of the winding drum portions 33 are half lines extending from the rotational axis O toward center portions of the winding drum portions 33 in the circumferential direction when seen in the axial direction. The opening angle θ at the intermediate portions 37a of the slot opening portions 37 is 2.5°. The flange portions 34 which define the slot opening portions 37 from the upstream side in the rotation direction of the rotor 3 at the time of regeneration protrude slightly from the winding drum portions 33 at positions defining the intermediate portions 37a of the slot opening portions 37. Accordingly, the flange portions 34 which define the slot opening portions 37 from the upstream side in the rotation direction of the rotor 3 at the time of regeneration protrude from the winding drum portions 33 in the entire region in the axial direction.

Figure 4:
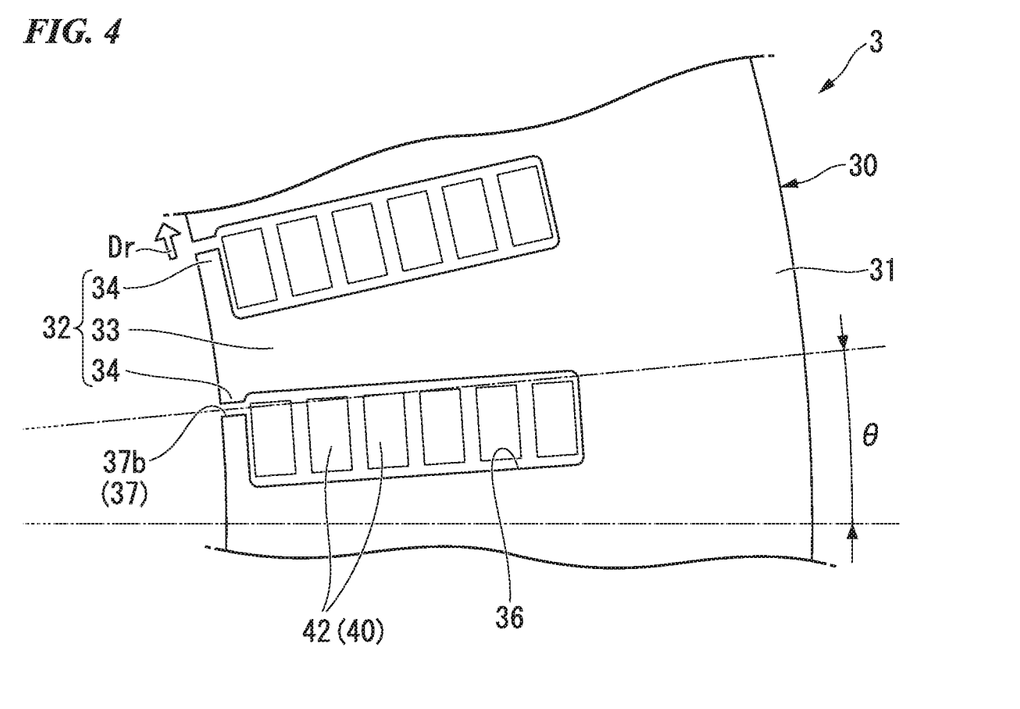
FIG. 4 is a view along arrow IV in FIG. 2.

FIG. 4 is a view along arrow IV in FIG. 2. In FIG. 4, a cross section through the first ends 37b of the slot opening portions 37 is shown, and a cross sectional structure passing through the second ends 37c (refer to FIG. 2) is similar.

As shown in FIG. 4, both ends 37b and 37c of the slot opening portions 37 open the vicinity of the ends of the slots 36 on the downstream side in the rotation direction of the rotor 3 at the time of regeneration. The opening angle θ at both ends 37b and 37c of the slot opening portions 37 is 5°. That is, the intermediate portions 37a (refer to FIG. 3) of the slot opening portions 37 are located on the upstream side by 2.5° in the rotation direction of the rotor 3 at the time of regeneration from the both ends 37b and 37c of the slot opening portions 37. The flange portions 34 which define the slot opening portions 37 from the downstream side in the rotation direction of the rotor 3 at the time of regeneration protrude slightly from the winding drum portions 33 at the positions defining both ends 37b and 37c of the slot opening portions 37. Accordingly, the flange portions 34 which define the slot opening portions 37 from the downstream side in the rotation direction of the rotor 3 at the time of regeneration protrude from the winding drum portions 33 in the entire region in the axial direction.

As shown in FIG. 2, the coils 40 are segmented coils having the plurality of phases. That is, each of the coils 40 is formed by dividing the coil of each phase into a plurality of members and connecting the plurality of members to each other. Each of the coils 40 has a coil end 41 (a protruding portion) which protrudes from the slot 36 in the axial direction. The coil end 41 includes a first coil end 41A which protrudes from the stator core 30 to one side in the axial direction, and a second coil end 41B which protrudes from the stator core 30 to the other side in the axial direction.

Each of the coils 40 has a plurality of coil bars 42 formed by a rectangular wire having a rectangular cross section.

The plurality of coil bars 42 are arranged in the radial direction every predetermined number (six in the embodiment) and inserted into the slots 36. Each of the coil bars 42 is provided to protrude from the stator core 30 toward both sides in the axial direction. A portion of each of the coil bars 42 which protrudes from the stator core 30 forms the coil end 41. Although not shown, an end of each of the coil bars 42 is bent in the circumferential direction to be close to an end of another coil bar 42 of the same phase, for example. The ends of the adjacent coil bars 42 are joined to each other by TIG welding, laser welding, or the like.

As shown in FIG. 1, the cooling unit 7 includes a rotor cooling unit 50 which cools the rotor 3 and a stator cooling unit 60 which cools the stator 5.

The rotor cooling unit 50 supplies a coolant to the rotor 3. An example of the coolant is, for example, an automatic transmission fluid used for lubrication and power transmission of a transmission. The rotor cooling unit 50 includes the axial flow path 11, the discharge hole 13, the inner peripheral side end surface flow path 23A, the core flow path 17, the outer peripheral side end surface flow path 23B, and an oil pump 51.

The oil pump 51 supplies the coolant to the axial flow path 11. The coolant supplied to the axial flow path 11 is discharged from the discharge hole 13 by a centrifugal force generated due to rotation of the rotor 3. The coolant discharged from the discharge hole 13 sequentially passes through the inner peripheral side end surface flow path 23A, the core flow path 17, and the outer peripheral side end surface flow path 23B and is discharged to the outside of the rotor 3. In this way, the rotor cooling unit 50 cools the rotor 3 by circulating a coolant inside the rotor 3.

The stator cooling unit 60 supplies a coolant to the stator 5. An example of the coolant is, for example, the automatic transmission fluid and is commonly used as the coolant used in the rotor cooling unit 50. The stator cooling unit 60 includes a coolant flow path 61 and an oil pump 64. The oil pump 64 supplies the coolant to the coolant flow path 61. The oil pump 64 may be shared with the oil pump 51 of the rotor cooling unit 50. The coolant flow path 61 is formed, for example, in a housing (not shown) which holds the stator core 30. The coolant flow path 61 extends to straddle the stator core 30 in the axial direction above the stator core 30. A coolant dripping portion 62 is formed in the coolant flow path 61. The coolant dripping portion 62 is a hole formed in the coolant flow path 61 and causes the coolant in the coolant flow path 61 to drip. The coolant dripping portion 62 is provided above each of the coil ends 41 on both sides of the coil 40 in the axial direction. Thus, the stator cooling unit 60 cools the coil 40 by dripping the coolant to the coil end 41 of the coil 40.

Next, an operation of the rotary electric machine 1 of the embodiment will be described.

Figure 5:
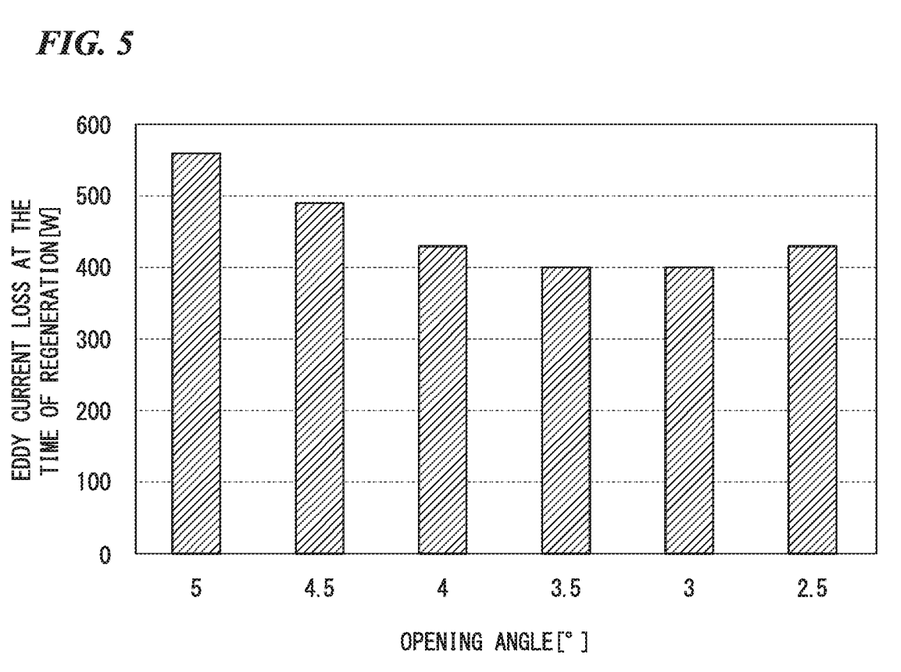
FIG. 5 is a graph showing a relationship between a position of an opening portion of a slot in a circumferential direction and an eddy current loss of a coil due to leakage magnetic flux at the time of regeneration.

FIG. 5 is a graph showing a relationship between a position of the slot opening portion in the circumferential direction and an eddy current loss of the coil due to the leakage magnetic flux at the time of regeneration. In FIG. 5, a horizontal axis shows the opening angle θ of the slot opening portion 37. A vertical axis shows the eddy current loss in a portion of the coil 40 located at the same position as the slot opening portion 37 in the axial direction.

As shown in FIG. 5, the eddy current loss in the coil 40 at the time of regeneration is larger at a position at which the opening angle θ is 5° than a position at which the opening angle θ is 2.5°. Further, the eddy current loss in the coil 40 at the time of regeneration is largest at the position in which the opening angle θ is 5°. That is, the eddy current loss in the coil 40 at the time of regeneration is larger at the same positions as the both ends 37b and 37c of the slot opening portions 37 than at the same positions as the intermediate portions 37a of the slot opening portions 37 in the axial direction. Accordingly, a temperature of the coil 40 becomes larger at the same positions as the both ends 37b and 37c of the slot opening portions 37 than at the same positions as the intermediate portions 37a of the slot opening portions 37.

In the embodiment, the slot opening portions 37 extend toward the upstream side in the rotation direction of the rotor 3 at the time of regeneration as it goes from the ends 37b and 37c on the coil end 41 side in the axial direction toward the intermediate portions 37a. Therefore, in the coil 40 disposed in the slot 36, the eddy current loss larger than that in the surroundings occurs at the same positions in the axial direction as the ends 37b and 37c of the slot opening portions 37 on the coil end 41 side. Thus, the temperature of the coil 40 is higher than that in the surroundings at the same positions in the axial direction as the ends 37b and 37c of the slot opening portions 37 on the coil end 41 side.

According to the cooling structure of the rotary electric machine of the embodiment, since the stator cooling unit 60 cools the coil end 41, it is possible to efficiently cool the portions of the coil 40 which are located at the same positions in the axial direction as the ends 37b and 37c of the slot opening portions 37 on the coil end 41 side and in which the temperature becomes higher than that in the surroundings. Therefore, the coil 40 can be appropriately cooled.

Further, the intermediate portions 37a of the slot opening portions 37 in the axial direction are located on the upstream side in the rotation direction of the rotor 3 at the time of regeneration from the both ends 37b and 37c of the slot opening portions 37 in the axial direction. Therefore, the coil 40 has a higher temperature than that in the surroundings at the same positions as the both ends 37b and 37c of the slot opening portions 37 in the axial direction. According to the embodiment, since the stator cooling unit 60 cools the coil ends 41 on both sides in the axial direction, it is possible to efficiently cool the portions of the coil 40 which are located at the same positions in the axial direction as the both ends 37b and 37c of the slot opening portions 37 and in which the temperature becomes higher that than in the surroundings.

The intermediate portion 37a of the slot opening portion 37 is located on the upstream side at a predetermined angle, at which a protrusion (the flange portion 34) is formed at the tip end of each of the teeth 32, from the both ends 37b and 37c of the slot opening portion 37 in the rotation direction of the rotor 3 at the time of regeneration. According to this constitution, since the flange portion 34 is always formed at the tip end of each of the teeth 32 irrespective of the position in the axial direction, only fine ribs are punched out at the tip end of each of the teeth 32 when the stator core 30 is punched out by press working, and thus it can be manufactured more easily.

Also, the predetermined angle is 2.5°. Therefore, as described above, the eddy current loss in the coil 40 becomes larger at the same position in the axial direction as the both ends 37b and 37c of the slot opening portions 37 than at the same position in the axial direction as the intermediate portions 37a of the slot opening portions 37. Thus, it is possible to efficiently cool the portion of the coil 40 in which the temperature becomes higher than that in the surroundings by cooling the coil end 41 with the stator cooling unit 60.

Also, since the stator cooling unit 60 drips the coolant to the coil end 41 of the coil 40, the coil end 41 can be cooled.

Further, the flange portions 34 protrude from the winding drum portions 33 toward the downstream side in the rotation direction of the rotor 3 at the time of regeneration at the position defining the intermediate portions 37a of the slot opening portions 37. Also, the flange portions 34 protrude from the winding drum portions 33 toward the upstream side in the rotation direction of the rotor 3 at the time of regeneration at each of the positions defining the both ends 37b and 37c of the slot opening portions 37. According to this constitution, it is possible to secure a magnetic path in the stator 5 and to reduce torque ripple without lowering torque.

Second Embodiment

Subsequently, a case in which the rotary electric machine is a driving motor will be described. Constitutions other than those described below are the same as those in the first embodiment.

A rotary electric machine 1A of a second embodiment is a driving motor and is used as a driving motor mounted in, for example, a vehicle such as a hybrid vehicle or an electric vehicle. The rotary electric machine 1A includes the rotor 3, the stator 5, and the cooling unit 7.

Figure 6:
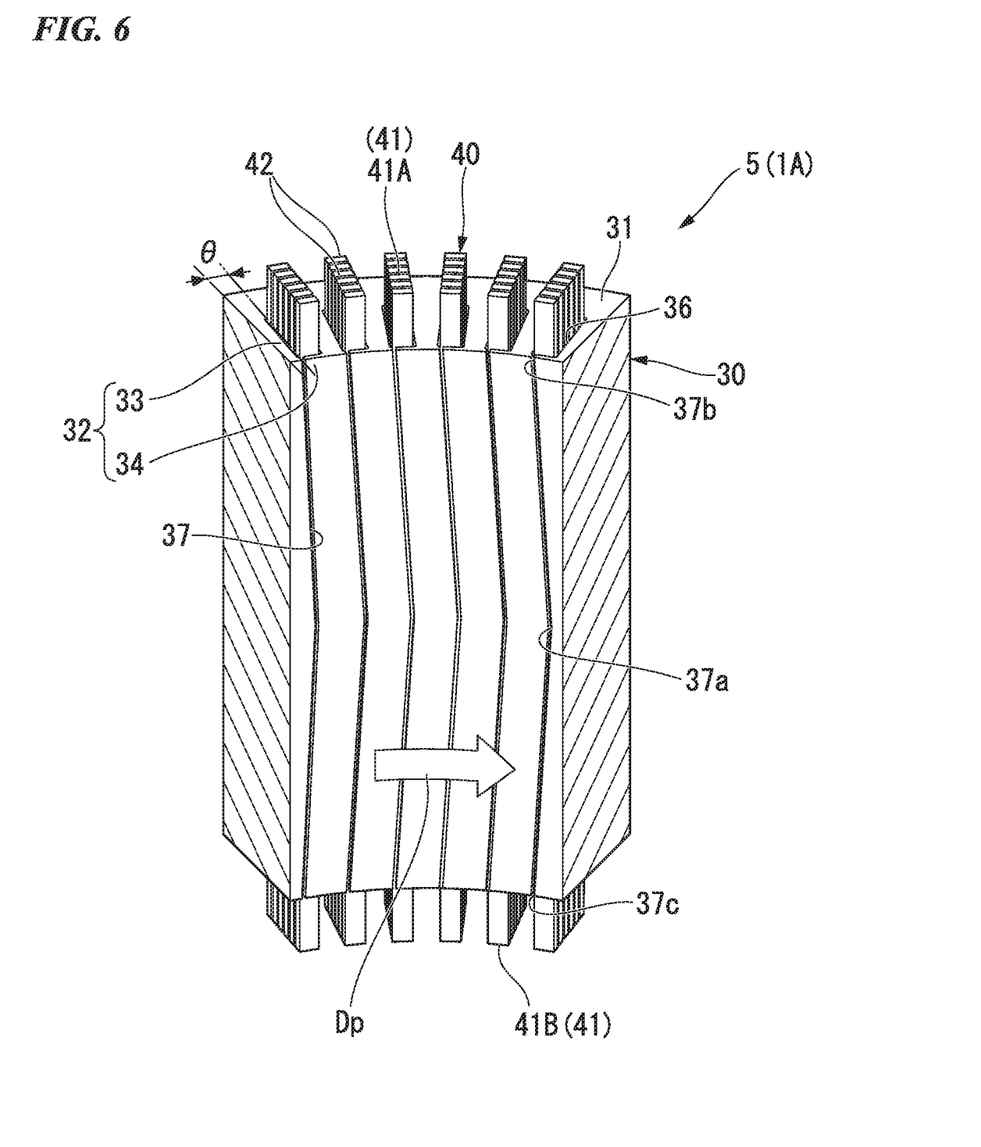
FIG. 6 is a perspective view showing part of a stator according to a second embodiment.

FIG. 6 is a perspective view showing part of a stator according to a second embodiment.

As shown in FIG. 6, in the second embodiment, the slot opening portions 37 extend toward the downstream side in the rotation direction of the rotor 3 at the time of power running from the first ends 37b on one side in the axial direction toward the intermediate portions 37a. Also, the slot opening portions 37 extend toward the downstream side in the rotation direction of the rotor 3 at the time of power running from the second ends 37c on the other side in the axial direction toward the intermediate portions 37a. In each of the drawings, the rotation direction of the rotor 3 at the time of power running is indicated by an arrow Dp. The rotation direction of the rotor 3 at the time of power running is a main rotation direction of the rotor 3 when the rotary electric machine 1A is used. For example, when the rotary electric machine 1A is a traveling motor mounted in a vehicle, the rotation direction of the rotor 3 at the time of power running is a direction in which the rotor 3 rotates when the vehicle advances.

Here, in the second embodiment, an opening angle θ of the slot opening portion 37 is defined as follows. In the cross-sectional view of the stator core 30 in the axial direction, the opening angle θ of the slot opening portions 37 is a center angle between center lines of the slot opening portions 37 and a center line of the winding drum portion 33 of each of the teeth 32 defining the slot opening portions 37 from the upstream side in the rotation direction of the rotor 3 at the time of power running. In this case, the opening angle θ at the intermediate portions 37a of the slot opening portion 37 is 5°. Further, the opening angle θ at both ends 37b and 37c of the slot opening portions 37 is 2.5°. That is, the intermediate portions 37a of the slot opening portions 37 are located on the downstream side by 2.5° in the rotation direction of the rotor 3 at the time of power running from both ends 37b and 37c of the slot opening portions 37.

Next, an operation of the rotary electric machine 1A of the embodiment will be described.

Figure 7:
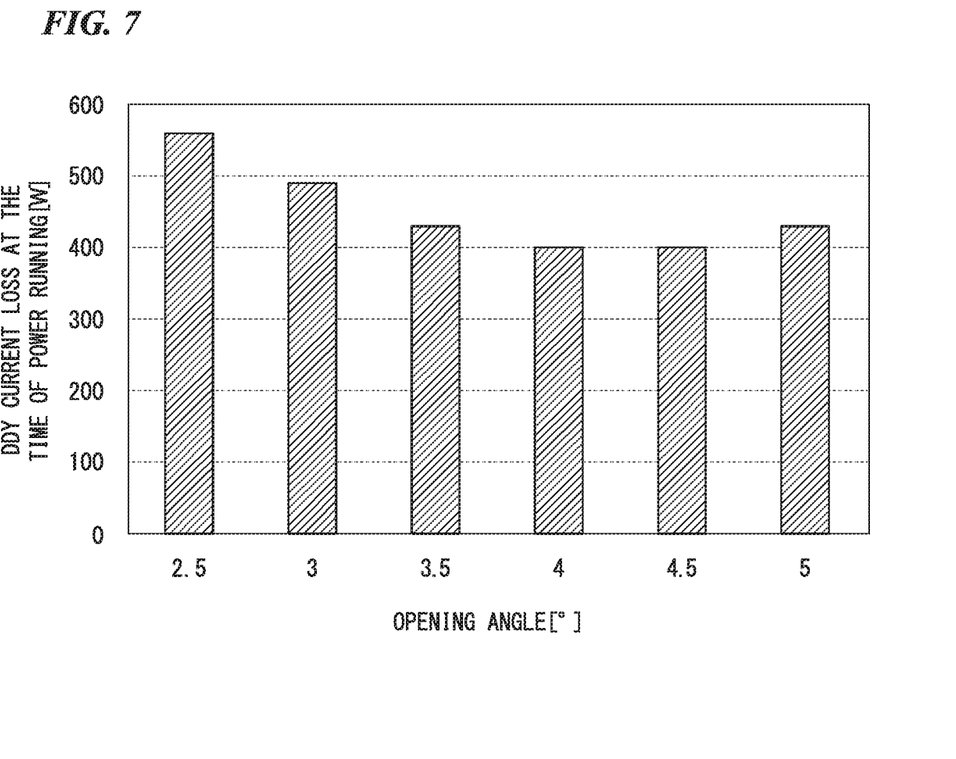
FIG. 7 is a graph showing the relationship between the position of the opening portion of the slot in the circumferential direction and the eddy current loss of the coil due to the leakage magnetic flux at the time of power running.

FIG. 7 is a graph showing the relationship between the position of the opening portion of the slot in the circumferential direction and the eddy current loss of the coil due to the leakage magnetic flux at the time of power running. In FIG. 7, a horizontal axis shows the opening angle θ of the slot opening portion 37. A vertical axis shows the eddy current loss in a portion of the coil 40 located at the same position as the slot opening portion 37 in the axial direction.

As shown in FIG. 7, the eddy current loss in the coil 40 at the time of power running is larger at a position at which the opening angle θ is 2.5° than a position at which the opening angle θ is 5°. Further, the eddy current loss in the coil 40 at the time of power running is largest at the position in which the opening angle θ is 2.5°.

That is, the eddy current loss in the coil 40 at the time of power running is larger at the same positions as the both ends 37b and 37c of the slot opening portions 37 than at the same positions as the intermediate portions 37a of the slot opening portions 37 in the axial direction. Accordingly, a temperature of the coil 40 becomes larger at the same positions as both ends 37b and 37c of the slot opening portions 37 than at the same positions as the intermediate portions 37a of the slot opening portions 37.

In the embodiment, the slot opening portion 37 extends toward the downstream side in the rotation direction of the rotor 3 at the time of power running as it goes from the ends 37b and 37c on the coil end 41 side in the axial direction toward the intermediate portion 37a. Therefore, in the coil 40 disposed in the slot 36, the eddy current loss larger than that in the surroundings occurs at the same positions in the axial direction as the ends 37b and 37c of the slot opening portions 37 on the coil end 41 side. Thus, the temperature of the coil 40 is higher than that in the surroundings at the same positions in the axial direction as the ends 37b and 37c of the slot opening portions 37 on the coil end 41 side.

According to the cooling structure of the rotary electric machine of the embodiment, since the stator cooling unit 60 cools the coil end 41, the coil 40 can be appropriately cooled, as in the first embodiment.

Third Embodiment

Figure 8:
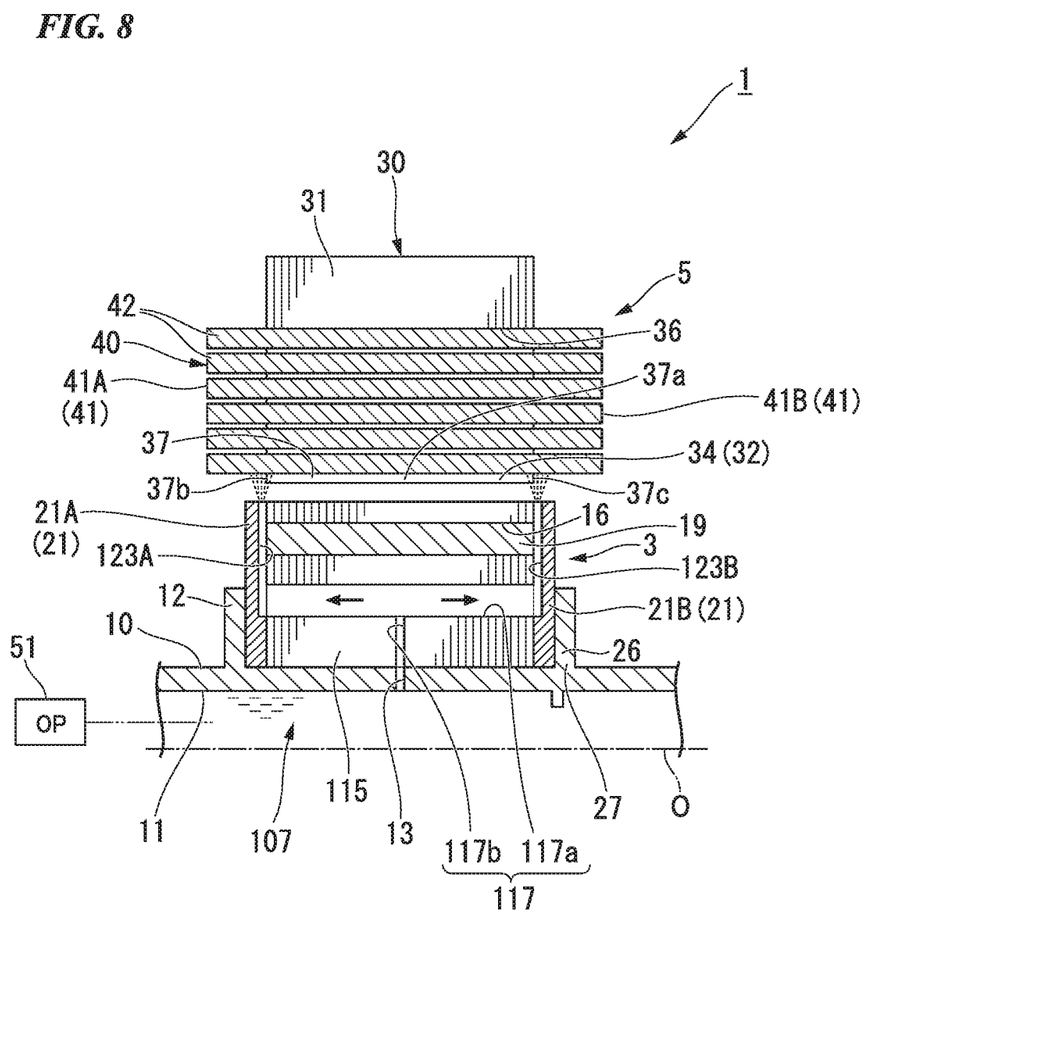
FIG. 8 is a cross-sectional view schematically showing a schematic constitution of a rotary electric machine according to a third embodiment.

FIG. 8 is a cross-sectional view schematically showing a schematic constitution of a rotary electric machine according to a third embodiment.

In the first embodiment shown in FIG. 1, the coil 40 is cooled by dripping a coolant to the coil end 41 of the coil 40. On the contrary, the third embodiment shown in FIG. 8 is different from the first embodiment in that the coil 40 is cooled by bringing the coil end 41 of the coil 40 into direct contact with the coolant discharged from the rotor 3. FIG. 8 shows a case in which a cooling unit 107 is applied to the rotary electric machine 1 which is a motor for power generation, but the cooling unit 107 may be applied to the driving rotary electric machine 1A.

As shown in FIG. 8, a core flow path 117 through which a coolant can flow is formed in a rotor core 115. The core flow path 117 includes a first core flow path 117a and a second core flow path 117b. The first core flow path 117a is formed radially inward from the magnet slot 16 and passes through the rotor core 115 in the axial direction. The second core flow path 117b extends in a direction intersecting the axial direction. In the illustrated example, the second core flow path 117b extends in a direction orthogonal to the axial direction. An outer end of the second core flow path 117b in the radial direction communicates with an intermediate portion of the first core flow path 117a in the axial direction. An inner end of the second core flow path 117b in the radial direction communicates with an axial flow path 11 via the discharge hole 13 of the rotating shaft 10.

End surface flow paths 123A and 123B through which a coolant can flow are formed between the rotor core 115 and the end surface plate 21. The end surface flow paths 123A and 123B are formed by providing grooves in the end surface plate 21, for example. The end surface flow paths 123A and 123B are a first end surface flow path 123A and a second end surface flow path 123B. The first end surface flow path 123A is formed between the rotor core 115 and the first end surface plate 21A. The first end surface flow path 123A extends in a direction orthogonal to the axial direction. An inner end of the first end surface flow path 123A in the radial direction communicates with an end of the first core flow path 117a on one side in the axial direction. An outer end of the first end surface flow path 123A in the radial direction is open to the outer peripheral surface of the rotor 3. The outer end of the first end surface flow path 123A in the radial direction is formed at the same position as that of the first coil end 41A of the coil 40 in the axial direction. The second end surface flow path 123B is formed between the rotor core 115 and the second end surface plate 21B.

The second end surface flow path 123B extends in a direction orthogonal to the axial direction. An inner end of the second end surface flow path 123B in the radial direction communicates with an end of the first core flow path 117a on the other axial side. An outer end of the second end surface flow path 123B in the radial direction is open to the outer peripheral surface of the rotor 3. The outer end of the second end surface flow path 123B in the radial direction is formed at the same position as the second coil end 41B of the coil 40 in the axial direction.

The cooling unit 107 supplies the coolant to the rotor 3 and the stator 5 to cool them. An example of the coolant is, for example, an automatic transmission fluid. The cooling unit 107 includes the above-described axial flow path 11, discharge hole 13, core flow path 117, end surface flow paths 123A and 123B, and oil pump 51 (a coolant supply unit). The oil pump 51 supplies the coolant to the axial flow path 11 inside the rotating shaft 10. The coolant supplied to the axial flow path 11 is discharged from the discharge hole 13 by a centrifugal force generated due to the rotation of the rotor 3. The coolant discharged from the discharge hole 13 sequentially passes through the second core flow path 117b, the first core flow path 117a, and the end surface flow paths 123A and 123B and is discharged to the outside of the rotor 3. The coolant discharged from the end surface flow paths 123A and 123B flies radially outward due to the centrifugal force and comes into direct contact with the coil end 41 of the coil 40. In this way, the cooling unit 107 cools the rotor 3 by circulating the coolant inside the rotor core 115 and cools the coil 40 by bringing the coil end 41 of the coil 40 into direct contact with the coolant which has flowed through the inside of the rotor 3.

As described above, according to the embodiment, since the coil end 41 is cooled by the cooling unit 107, the coil 40 can be appropriately cooled, as in the first embodiment.

Further, the cooling unit 107 includes the oil pump 51 which supplies the coolant to the axial flow path 11, the discharge hole 13 which is open to the outer peripheral surface of the rotating shaft 10, the core flow path 117 which is formed in the rotor core 115 and communicates with the axial flow path 11 via the discharge hole 13, and the end surface flow paths 123A and 123B which are formed between the rotor core 115 and the end surface plate 21, communicate with the core flow path 117 and open outward in the radial direction at the same position as the coil end 41 in the axial direction. According to this constitution, the rotor 3 can be cooled by circulating the coolant through the axial flow path 11, the core flow path 117, and the end surface flow paths 123A and 123B. Further, since the coolant is discharged radially outward from the end surface flow paths 123A and 123B by the centrifugal force, the coolant can reach the coil end 41.

Accordingly, the coil end 41 can be cooled. Therefore, it can serve as means for cooling the rotor 3 and means for cooling the coil 40. Therefore, the constitution of the rotary electric machine 1 can be simplified.

The present invention is not limited to the above-described embodiments described with reference to the drawings, and various modified examples are conceivable in the technical scope thereof.

For example, in each of the embodiments, the intermediate portions 37a of the slot opening portions 37 are separated from the both ends 37b and 37c of the slot opening portions 37 by the same distance in the axial direction, but the present invention is not limited thereto. The intermediate portions of the slot opening portions may be shifted from the position separated from both ends 37b and 37c of the slot opening portions 37 by the same distance in the axial direction. That is, it is not absolutely necessary for the portion of the slot opening portion located on the most upstream side in the rotation direction of the rotor 3 at the time of regeneration to be provided at the positions separated from both ends 37b and 37c of the slot opening portions 37 by the same distance in the axial direction.

Further, in each of the embodiment, the both ends 37b and 37c of the slot opening portions 37 are provided at the same position in the circumferential direction, but they may be provided at mutually shifted positions in the circumferential direction.

Further, in each of the embodiment, the slot opening portions 37 extend obliquely at a predetermined angle with respect to the axial direction toward the both sides in the axial direction with the intermediate portions 37a as center, but the present invention is not limited thereto. The slot opening portions may extend so that the inclination angle with respect to the axial direction varies.

Besides, it is possible to appropriately replace the elements in the above-described embodiments with well-known elements, and the above-described respective embodiments may be combined as appropriate within the scope not deviating from the gist of the present invention.

What is claimed is:

1. A cooling structure of a rotary electric machine for power generation which includes a rotor and a stator, comprising:

a stator core which is formed in an annular shape to surround the rotor and has a plurality of slots arranged in a circumferential direction and extending from one end to the other end in a center axis direction;

a conductor which is disposed in the slots and has a protruding portion protruding from the slots in the center axis direction; and a cooling unit which cools the protruding portion, wherein opening portions of the slots are formed in an inner peripheral surface of the stator core, and the opening portions extend toward an upstream side in a rotation direction of the rotor at a time of regeneration from ends on the protruding portion side toward intermediate portions in the center axis direction.

2. The cooling structure according to claim 1, wherein:
the intermediate portions of the opening portions are located on the upstream side in the rotation direction of the rotor at the time of regeneration from both ends of the opening portions in the center axis direction, and
the cooling unit cools the protruding portion on both sides in the center axis direction.

3. The cooling structure according to claim 1, wherein:
the stator core includes teeth that are formed between adjacent slots in the circumferential direction,
the opening portions are formed between tip ends of the teeth adjacent to each other in the circumferential direction, and
the intermediate portions of the opening portions are located on the upstream side at a predetermined angle, at which a protrusion is formed at the tip end of each of the teeth in the rotation direction of the rotor at the time of regeneration, from an end of the opening portion on the protruding portion side.

4. A cooling structure of a driving rotary electric machine which includes a rotor and a stator, comprising:
a stator core which is formed in an annular shape to surround the rotor and has a plurality of slots arranged in a circumferential direction and extending from one end to the other end in a center axis direction;
a conductor which is disposed in the slots and has a protruding portion protruding from the slots in the center axis direction; and
a cooling unit which cools the protruding portion,
wherein opening portions of the slots are formed in an inner peripheral surface of the stator core, and
the opening portions extend toward a downstream side in a rotation direction of the rotor at a time of power running from ends on the protruding portion side toward intermediate portions in the center axis direction.

5. The cooling structure according to claim 4, wherein:
the intermediate portions of the opening portions are located on the downstream side in the rotation direction of the rotor at the time of power running from both ends of the opening portions in the center axis direction, and
the cooling unit cools the protruding portion on both sides in the center axis direction.

6. The cooling structure according to claim 4, wherein:
the stator core includes teeth that are formed between adjacent slots in the circumferential direction,
the opening portions are formed between tip ends of the teeth adjacent to each other in the circumferential direction, and
the intermediate portions of the opening portions are located on the downstream side at a predetermined angle, at which a protrusion is formed at the tip end of each of the teeth in the rotation direction of the rotor at the time of power running, from an end of the opening portion on the protruding portion side.

7. The cooling structure according to claim 3, wherein the predetermined angle is 2.5°.

8. The cooling structure according to claim 1, wherein the cooling unit drips a coolant to the protruding portion.

9. The cooling structure according to claim 1, wherein:
the rotor includes a rotating shaft formed in a hollow and through which a coolant flows, a rotor core penetrating the rotating shaft and disposed inside the stator core, and a pair of end surface plates sandwiching the rotor core from both sides in the center axis direction, and
the cooling unit includes a coolant supply unit which supplies a coolant to an inside of the rotating shaft, a through-hole which is open to an outer peripheral surface of the rotating shaft, a core flow path which is formed in the rotor core and communicates with the inside of the rotating shaft via the through-hole, and an end surface flow path which is formed between the rotor core and the end surface plate, communicates with the core flow path and opens outward in a radial direction at the same position as the protruding portion in the center axis direction.

10. A rotary electric machine comprising the cooling structure of the rotary electric machine according to claim 1.

* * * * *